(12) United States Patent
Langrell et al.

(10) Patent No.: US 11,129,355 B2
(45) Date of Patent: Sep. 28, 2021

(54) PORTABLE LIVESTOCK HANDLING APPARATUS WITH FOLDABLE FORCE TUB AND EXTENDABLE/COLLAPSIBLE CHASSIS

(71) Applicant: Northquip Inc., Woodlands (CA)

(72) Inventors: Stephen Arthur Langrell, Woodlands (CA); Philip Malcolm Firth, Woodlands (CA)

(73) Assignee: Northquip Inc., Woodlands (CA)

(*) Notice: Subject to any disclaimer, the term of this patent is extended or adjusted under 35 U.S.C. 154(b) by 0 days.

(21) Appl. No.: 17/226,323

(22) Filed: Apr. 9, 2021

(65) Prior Publication Data
US 2021/0219516 A1 Jul. 22, 2021

Related U.S. Application Data

(63) Continuation of application No. PCT/CA2019/051566, filed on Nov. 4, 2019.

(51) Int. Cl.
*A01K 1/00* (2006.01)

(52) U.S. Cl.
CPC .................. *A01K 1/0035* (2013.01)

(58) Field of Classification Search
CPC ............................ A01K 1/0035; A01K 1/009
USPC .................... 119/502, 510, 512, 514, 843
See application file for complete search history.

(56) References Cited

U.S. PATENT DOCUMENTS

| 4,829,936 A | 5/1989 | Mollhagen |
| 4,898,121 A | 2/1990 | Reynolds |
| 4,960,074 A | 10/1990 | Wilson |
| 5,115,763 A | 5/1992 | Wilson |
| 5,381,757 A * | 1/1995 | Putney ............... A01K 3/00 119/512 |
| 6,021,742 A | 2/2000 | Cummings |
| 7,174,853 B1 | 2/2007 | Donaldson |
| 9,226,476 B2 | 1/2016 | Wilson |
| 9,844,204 B2 | 12/2017 | Schwartz |
| 2011/0280012 A1 | 7/2011 | Meyer, Jr. |
| 2020/0305386 A1* | 10/2020 | Niemela ........... A01K 1/0035 |

OTHER PUBLICATIONS

Portable Tub Single Alley, Titan West Inc. Livestock Handling Equipment, Dec. 19, 2012, www.titanwestinc.com/products/porttubs.html.

* cited by examiner

*Primary Examiner* — Ebony E Evans
(74) *Attorney, Agent, or Firm* — Kyle R Satterthwaite; Ryan W Dupuis; Ade & Company Inc.

(57) ABSTRACT

A portable livestock handling apparatus features a set of arc-shaped wall panels carried on a rearmost section of a towable chassis, and pivotally interconnected to one another for swinging movement between deployed positions forming continuous arcuate extensions of one another to collectively define an arcuate wall span of the tub, and stowed positions folded up alongside one another to occupy a compact area on the chassis. The rearmost chassis section is longer on one side than the other, and features a chassis extension extendable from the rear end of the chassis to connect to one of the deployed panels. This elongated side and extension form the only ground-level connections between the chassis and the tub wall to minimize tripping hazards.

20 Claims, 11 Drawing Sheets

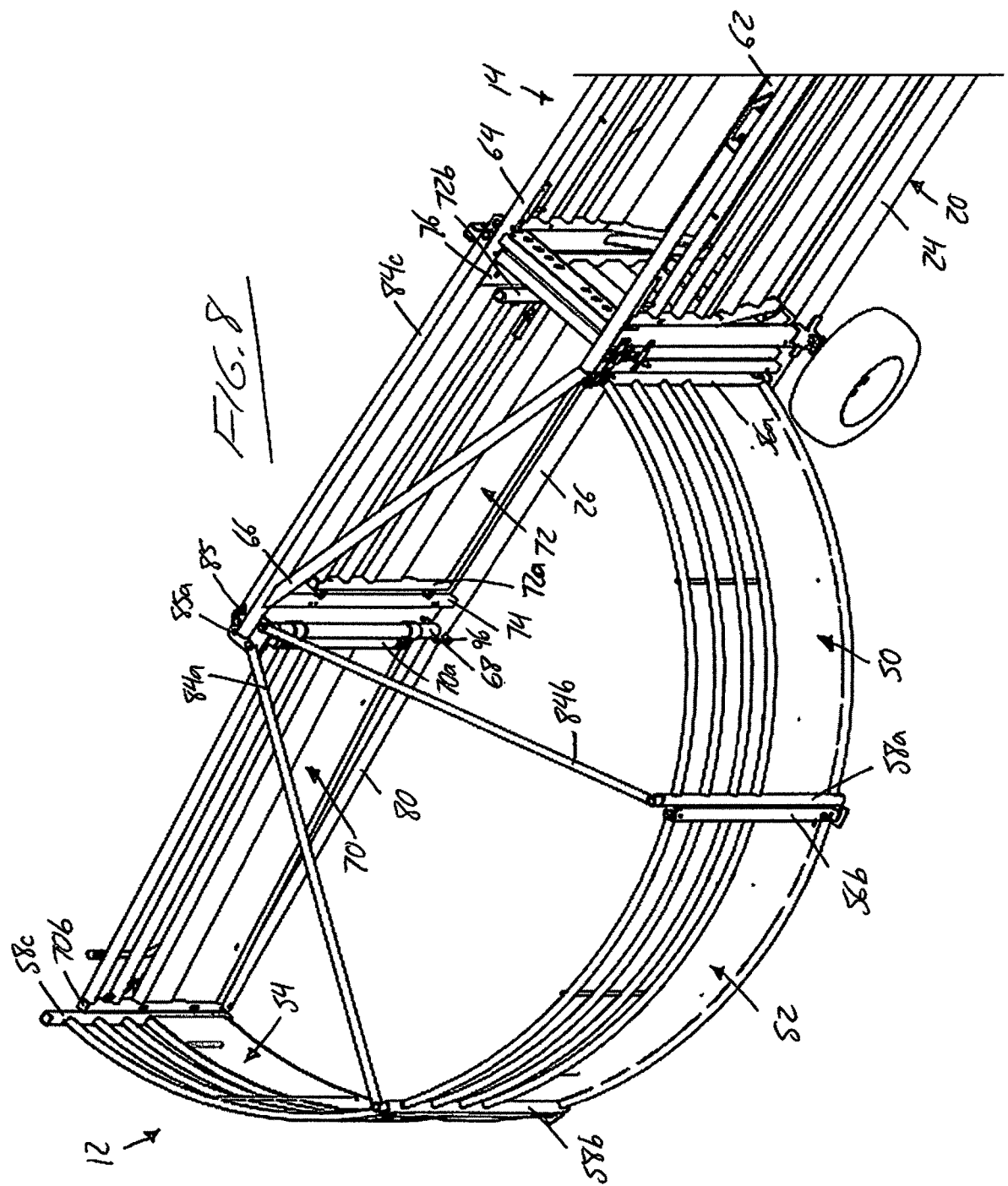

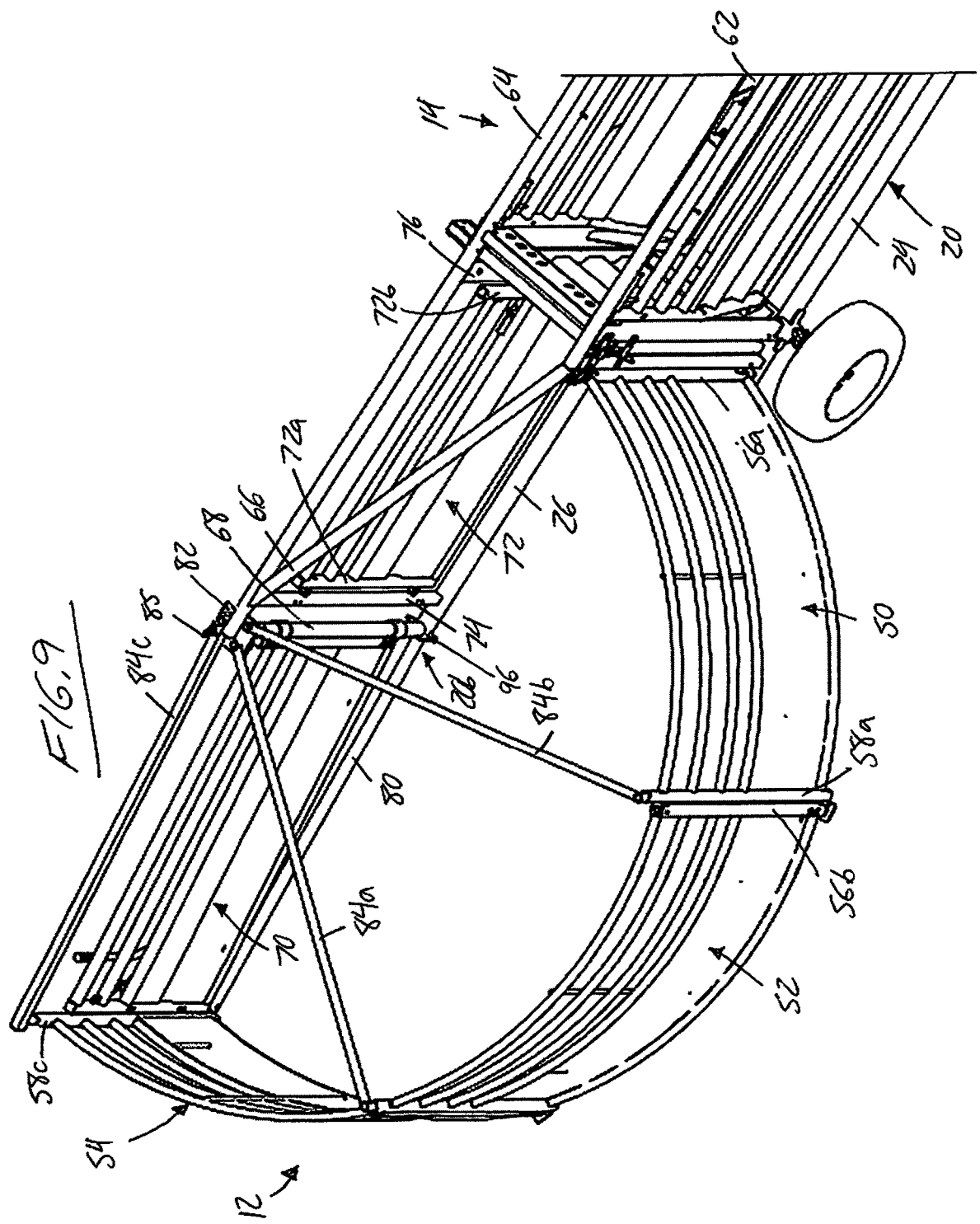

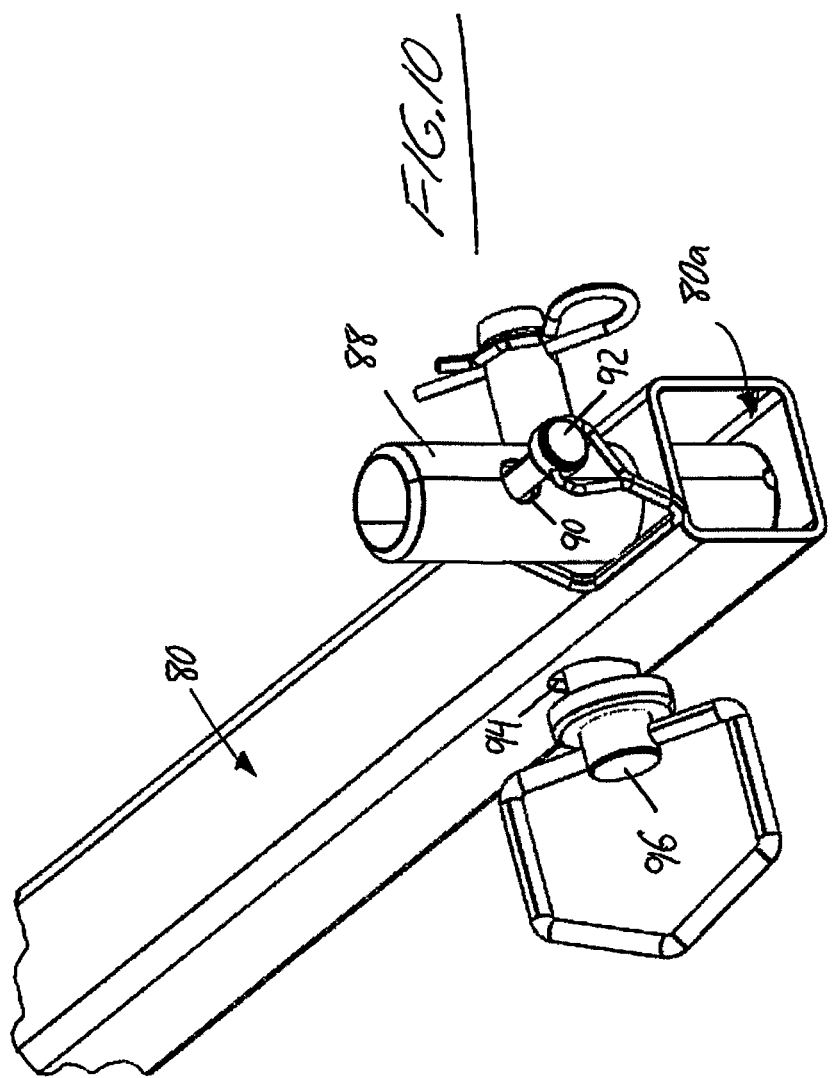

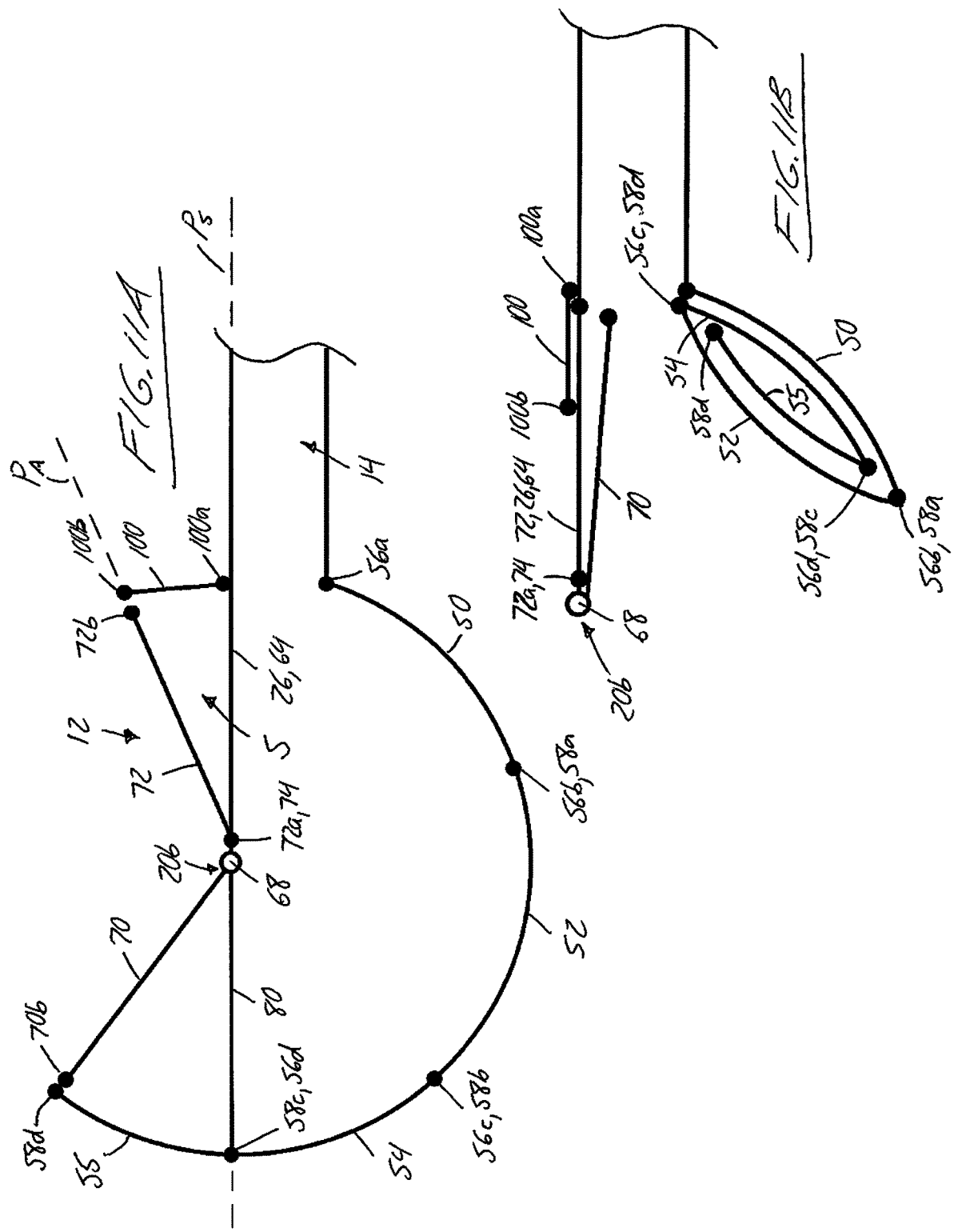

PORTABLE LIVESTOCK HANDLING APPARATUS WITH FOLDABLE FORCE TUB AND EXTENDABLE/COLLAPSIBLE CHASSIS

CROSS-REFERENCE TO RELATED APPLICATIONS

This application is a continuation of PCT Application No. PCT/CA2019/051566, filed Nov. 4, 2019, the entirety of which is incorporated herein by reference.

FIELD OF THE INVENTION

The present invention relates generally to livestock handling equipment, and more particularly to portable livestock handling apparatuses including collapsible force tubs by which a footprint of the apparatus is reduceable for road transport.

BACKGROUND

In the field of livestock handling equipment, is known to provide a portable apparatus having a wheeled chassis that is towable by a vehicle and has carried thereon a force tub (also known as a crowding tub), an alleyway leading out from the force tub at an exit thereof, and optionally a squeeze chute into which the alleyway leads from the force tub. Each of these functionally different subsystems of the apparatus occupies or is built off of a respective section of the chassis between longitudinally opposing front and rear ends thereof, one of which is equipped with a pull tongue or gooseneck for connection to the hitch of a pickup truck or other suitably equipped tow vehicle. To reduce the width of the apparatus for road travel, it has been proposed to design the force tub in a collapsible manner of some type.

U.S. Pat. No. 7,174,853 discloses an example in which the force tub is erected from a plurality of discrete wall panels that are completely disassembled from one another to collapse the apparatus into road transport mode. In this design, the force tub is erected beneath a gooseneck at the front end of the chassis from which the apparatus is towed in road transport mode.

Another example is Applicant's previously marketed portable cattle alley and tub units employing a foldable tub at a rearmost section of the chassis opposite the vehicle-towed front end, in which arc-shaped tub wall panels are each individually hinged to the rearmost chassis section for swinging movement about respective uprights axes. While this folding solution provided sufficient width reduction for road travel, it required a relatively long rearmost chassis section of fixed length spanning the entire width of the deployed force tub. The unit thus possessed a notable overall length that remained the same in both road transport mode and field mode.

Titan West Inc. offers portable alley and tub units with a different style of foldable tub, in which a set of rectangular sub-frames are pivotally mounted to the rearmost section of the chassis for swinging movement about an upright axis at a rear end of the chassis into deployed positions spanning radially outward therefrom at different angles. One curved wall panel is pivotally mounted to the chassis, and two others are respectively hinged to two of the swingable sub-frames. Another of the swingable sub-frames reaches rearwardly from the chassis, and the free-swinging ends of the hinged wall panels are then pinned to the deployed sub-frames. This design enables reduced length for road transport compared to field use, but there remains room for improved and alternative options for achieving a collapsed transport mode in a tub and alley unit.

In view of this, Applicant discloses herein an inventive portable livestock handling apparatus with a unique combination of features not heretofore seen in the art.

SUMMARY OF THE INVENTION

According to a first aspect of the invention there is provided a livestock handling apparatus comprising:

a chassis having a front end and opposing rear end spaced apart in a longitudinal direction;

a collapsible force tub carried on said chassis at a rearmost section thereof nearest the rear end of said chassis, said collapsible force tube comprising a plurality of arc-shaped wall panels selectively placeable in cooperatively deployed positions to form a collective arcuate wall span along which livestock can be encouraged; and a chassis extension movably mounted to the chassis in a manner selectively slidable longitudinally rearward from a retracted storage position into an extended working position in which said chassis extension spans rearwardly from the rear end of the chassis and connects to said collective arcuate wall span at a spaced distance from said rear end of the chassis.

According to a second aspect of the invention there is provided a livestock handling apparatus comprising:

a chassis having a front end and opposing rear end spaced apart in a longitudinal direction;

a collapsible force tub carried on said chassis at a rearmost section thereof nearest the rear end of said chassis, said collapsible force tube comprising a plurality of arc-shaped wall panels selectively placeable in cooperatively deployed positions to form a collective arcuate wall span along which livestock can be encouraged; and a plurality of spokes movable between stowed positions carried on the chassis in positions reaching forwardly along the chassis toward the front end thereof, and working positions radiating outwardly from a hub on the rearmost section of the chassis and connecting up with the collective arcuate wall span cooperatively formed by the arc-shaped wall panels;

wherein said plurality of spokes include:
at least a first spoke whose stowed position is located on a first side of the chassis; and
at least one additional spoke whose stowed position is located on an opposing second side of the chassis.

According to a third aspect of the invention there is provided a livestock handling apparatus comprising:

a framework comprising a chassis having a front end and opposing rear end spaced apart in a longitudinal direction; and a collapsible force tub carried on said chassis at a rearmost section thereof nearest the rear end of said chassis, said collapsible force tube comprising a plurality of arc-shaped wall panels selectively placeable in cooperatively deployed positions to form a collective arcuate wall span along which livestock can be encouraged;

wherein the rearmost section of the chassis has a first shorter side and a second longer side, and the plurality of arc-shaped wall panels are configured for selective stowage thereof at a location beside the longer side of the rearmost section of the chassis and behind the shorter side of the rearmost section of the chassis.

BRIEF DESCRIPTION OF THE DRAWINGS

Preferred embodiments of the invention will now be described in conjunction with the accompanying drawings in which:

FIG. 8 is partial perspective view of the first embodiment apparatus at a sixth stage of said deployment.

FIG. 9 is partial perspective view of the first embodiment apparatus at a seventh and final stage of said deployment FIG. 10 is a partial closeup view of a chassis extension of the first embodiment apparatus that is shown in an extended working position in FIG. 8.

FIG. 11A is a partial schematic overhead view of an alternative embodiment of the portable livestock handling apparatus, showing same in its final stage of deployment, comparable to FIG. 9 of the first embodiment.

FIG. 11B is partial schematic overhead view of the alternative embodiment at the first stage of its deployment, comparable to FIG. 3 of the first embodiment.

In the drawings like characters of reference indicate corresponding parts in the different figures.

DETAILED DESCRIPTION

Figure 1:
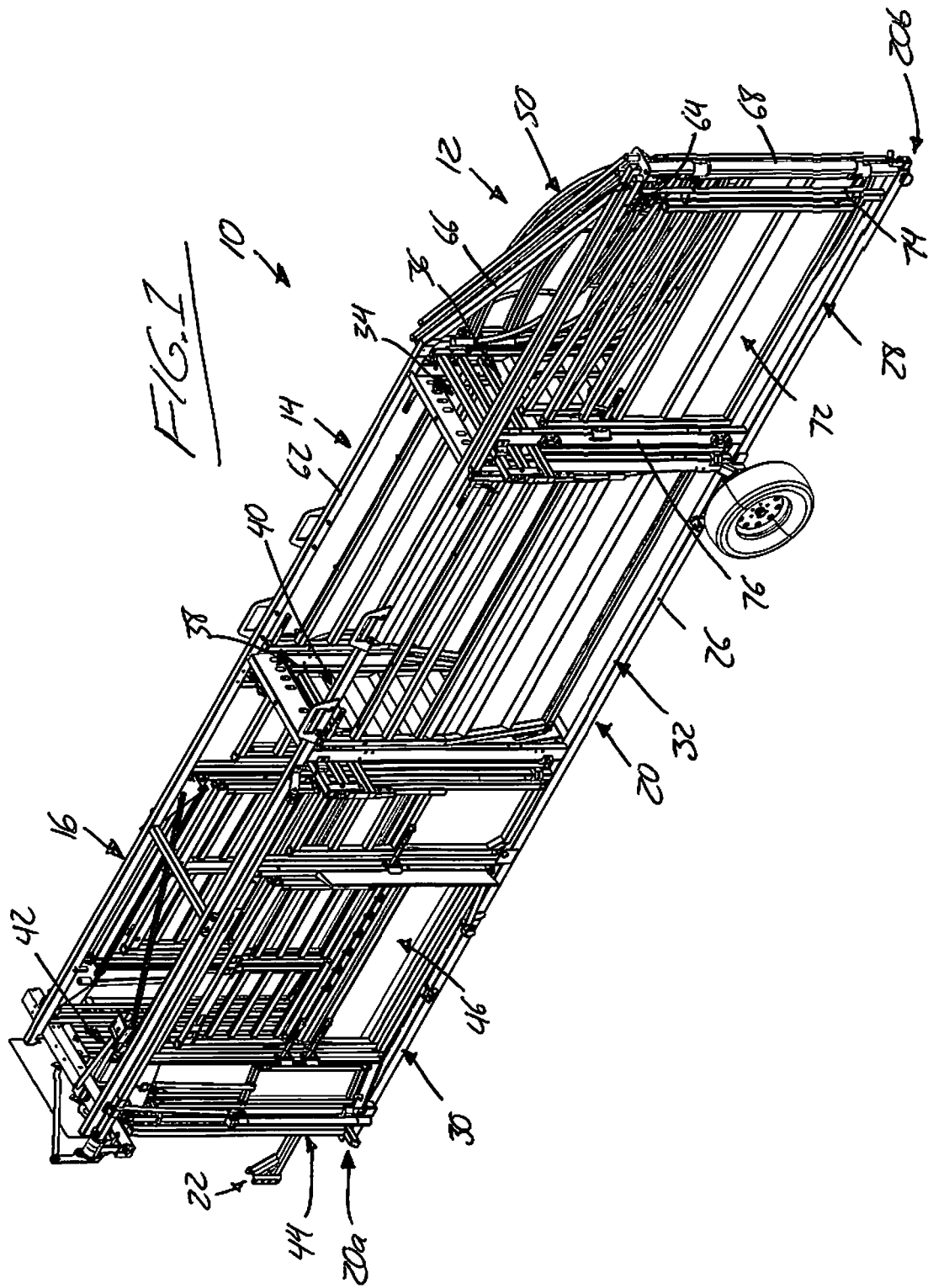
FIG. 1 is a rear perspective view of a portable livestock handling apparatus according to a first embodiment of the present invention, as viewed from one side thereof.

FIGS. 1 to 10 illustrate a first embodiment of a portable livestock handling apparatus 10 equipped with a foldable force tub 12 that folds into a compact state for road transport, and unfolds from such compacted condition into a deployed state for field use. In the illustrated example, the foldable tub is one of three different functional stations of the overall apparatus, and thus is accompanied by a neighbouring alleyway 14 through which livestock (e.g. cattle) depart the force tub, and a subsequent squeeze chute 16 installed at the opposing end of the alleyway 14 to admit the livestock from the alleyway on a singulated basis. In a known manner, a head gate and movable side panels of the squeeze chute are operable to hold the individually admitted animal in the squeeze chute for inspection and or treatment purposes. All three stations are carried on a shared chassis 20 having a longitudinal direction in which the stations are arranged in series between opposing front and rear ends 20a, 20b of the chassis that are horizontally spaced apart in this longitudinal direction, in which the wheeled chassis is towed during transport. However, it will be appreciated that the foldable force tub 12 of the present invention may similarly be installed on the chassis of a portable livestock handling apparatus regardless of the particular number and type of additional functional sections are included. One alternative embodiment may, for example, optionally omit the squeeze chute at the tub-opposing end of the alleyway.

In the illustrated embodiment, the front end 20a of the chassis 20 refers to the end thereof from which the apparatus 10 is towed, for example via a pull tongue 22 that is removably attached to a cross-member of the chassis that resides at this front end 20a of the chassis and perpendicularly interconnects first and second longitudinal beams 24, 26 of the chassis. The longitudinally opposing rear end 20b of the chassis thus trails the front end 20a during road transport of the apparatus. The longitudinal chassis beams 24, 26 lie in the longitudinal direction in which the front and rear end of the chassis are separated, and respectively define laterally opposing sides of the chassis and overall apparatus. The chassis in the illustrated embodiment is considered to have three distinct sections, each hosting a respective one of the three different functional stations mentioned above. A rearmost section 28 of the chassis adjacent the rear end 20b thereof carries the foldable force tub 12, a frontmost section 30 of the chassis adjacent the front end 20a thereof carries the squeeze chute 16, and an intermediate section 32 of the chassis situated longitudinally between the rearmost and frontmost sections 24, 26 carries the alleyway 14 that interconnects the foldable force tub 12 and squeeze chute 16.

The boundary between the rearmost section 28 and the intermediate section 32 is denoted by a framed opening 34 that defines an exit of the force tub 12, and thus also defines an entrance of the alleyway 14. A slide gate 36 is installed at this opening 34 to enable controlled admission of livestock from the force tub 12 to the alleyway 14. Likewise, the boundary between the intermediate section 32 and the frontmost section 30 is denoted by another framed opening 38 that defines an exit of the alleyway 14, and thus also defines an entrance of the squeeze chute 16. Another slide gate 40 is installed at this opening 38 to enable controlled admission of livestock on an individual basis from the alleyway 14 to the squeeze chute 16. A third and final framed opening 42 resides at the front end 20a of the chassis 20 and denotes an exit of the squeeze chute from which livestock depart the overall apparatus. This final exit opening 42 is equipped with an openable/closeable head gate 44 used in securing of the animal in an accessible position with their head outside the squeeze chute and the trailing remainder of their body still inside the chute, where the animal's body is held stationary by movable side walls 46 of the squeeze chute.

Having set the general context of the invention, particular attention is now turned to the novel rearmost section 28 of the chassis and the novel foldable force tub 12 installed thereon. Further detail of the alleyway and squeeze chute construction is omitted, and may be of any design known to those of skill in the art.

As best shown in FIGS. 5-9, the foldable force tub 12 features a first arc-shaped wall panel 50, a second arc-shaped wall panel 52, and a third arc-shaped wall panel 54, each of which is arcuately curved along a length dimension thereof measured horizontally between a proximal end of the wall panel and an opposing distal end thereof. The arcuate curvature of all three panels is the same, whereby the three wall panels share an equal radius of curvature. However, the third wall panel 54 is of lesser length than both the first and second wall panels 50, 52, which even if not exactly equal in length to one another, are of comparable length of greater similarity to one another than to the shorter third wall panel 54. Each wall panel features a respective upright proximal end post 56a, 56b, 56c at its proximal end, a respective upright distal end post 58a, 58b, 58c at its distal end, a series of curved horizontal rails 60 and optional cladding 61 spanning between the two end posts to form a wall barrier through which livestock cannot pass. If included, the cladding 61 serves to obstruct animal visibility through this barrier over a partial or full height thereof, depending on the selected height of cladding installed over an entirety or subset of the curved horizontal rails 60.

The first longitudinal chassis beam 24 is shorter than the second longitudinal chassis beam 26, and so it is the longer second longitudinal chassis beam 26 that defines the terminal rear end 20b of the chassis at a corresponding rear end of the chassis' rearmost section 28. The first longitudinal chassis beam 24 terminates well short of the terminal rear end 20b of the chassis, instead terminating at a short distance past the tub-exit/alleyway-entrance at the front end of the chassis' rearmost section 28.

A structural framework of the apparatus cooperates with the underlying chassis 20 to support moving functional componentry of the three stations. This structural framework features first and second longitudinal header beams 62, 64 that reside in respective elevated relation over the longitudinal chassis beams 24, 26, and are supported thereover by upright support posts mounted at longitudinally spaced intervals along the longitudinal chassis beams 24, 26. The longitudinal header beams 62, 64 are of non-equal length to one another, instead each being equal, or substantially similar, in length to the respective underlying one of the longitudinal chassis beams 24, 26. The first longitudinal header beam 62 is thus shorter than the second longitudinal header beam 64, and terminates a short distance rearward of the tub-exit/alleyway-entrance. Meanwhile, the second longitudinal header beam 64 extends fully to the terminal rear end 20b of the chassis, which thus corresponds to a terminal rear end of the overall apparatus as a whole, when in the collapsed road transport mode shown in FIGS. 1 and 2.

At the rearmost section 28, the structural framework further includes a bracing header beam 66 that angles obliquely from a rear end of the shorter first longitudinal header beam 62, and connects to the longer second longitudinal header beam 64 near the terminal rear end 20b of the chassis. Unlike the header of the structural framework, the chassis 20 lacks such an obliquely angled brace, whereby the rearmost chassis section 28 features only an elongated rear span of the second longitudinal chassis beam 26, and the dramatically shorter stub-like rear span of the first longitudinal chassis beam 24. As will become more apparent later, when the foldable force tub 12 is deployed, this minimalist chassis structure at the rearmost section thereof minimizes ground level componentry that might otherwise form tripping hazards within the interior space of the force tub during field use.

A center post 68 of the force tub 12 stands vertically upright from the second longitudinal chassis beam 26 at or adjacent the rear end 20b of the chassis. A movable barrier panel 70 of the force tub has a proximal end post 70a thereof journaled to the center post 68 for swinging movement of the barrier panel 70 around the center post 68 when the force tub is fully deployed. In transport mode, this barrier panel 70 is secured in a stowed position spanning forwardly from the center post 68 along the inside of the second longitudinal chassis beam 26 toward the tub-exit/alleyway-entrance. In transport mode, an additional closure panel 72 is stowed in secured fashion alongside the movable barrier panel 70 in a position overtop this same rear span of the longer second chassis beam 26.

In the illustrated embodiment, where the force tub 12 is of a front-loading type where livestock are admitted into the tub adjacent the tub-exit/alleyway-entrance at the front end of the force tub 12, this closure panel 72 is a movable gate panel having a supported end post 72a thereof hinged to a cooperating support post 74. As best seen in FIGS. 6-9, this support post 74 stands vertically upright between the second longitudinal chassis beam 26 and the second longitudinal header beam 64 at a position in front of the center post 68 and in close adjacency and parallel relation thereto. In the stowed position of the closure panel 72, an opposing end post 72b thereof is latched or otherwise secured to an upright securement post 76 that likewise spans upright between the second longitudinal chassis and header beams 26, 64 at or near the front end of the rear chassis section 28. When the force tub 12 is fully deployed and ready for field use, this free end of the closure panel 72 is released from the securement post 76 and swung laterally outward from the longer second side of the chassis to enable admission of livestock into the force tub at this second side of the apparatus through an entrance opening delimited vertically between the second longitudinal chassis and header beams 26, 64 and horizontally between the support and securement posts 74, 76. In other embodiments, the force tub may of a more conventional rear-loading type, in which the closure panel 72 may be a fixed non-movable panel, with admission of livestock instead being performed at a more rearward entrance area between the center post 68 and the distal end post of the third wall panel when deployed in the manner described further below.

Figure 2:
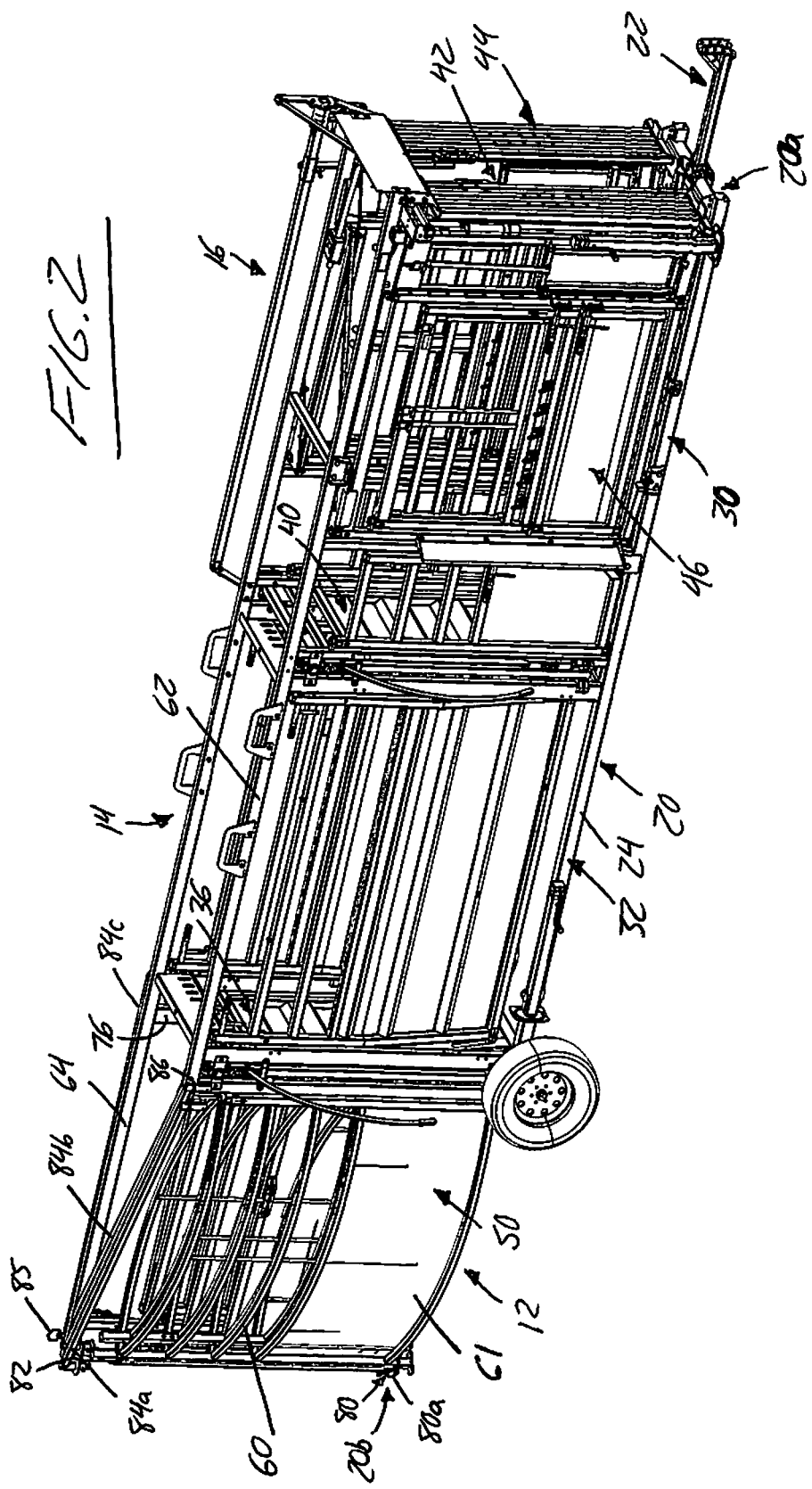
FIG. 2 is a front perspective view of the first embodiment apparatus from an opposing side thereof.
Figure 4:
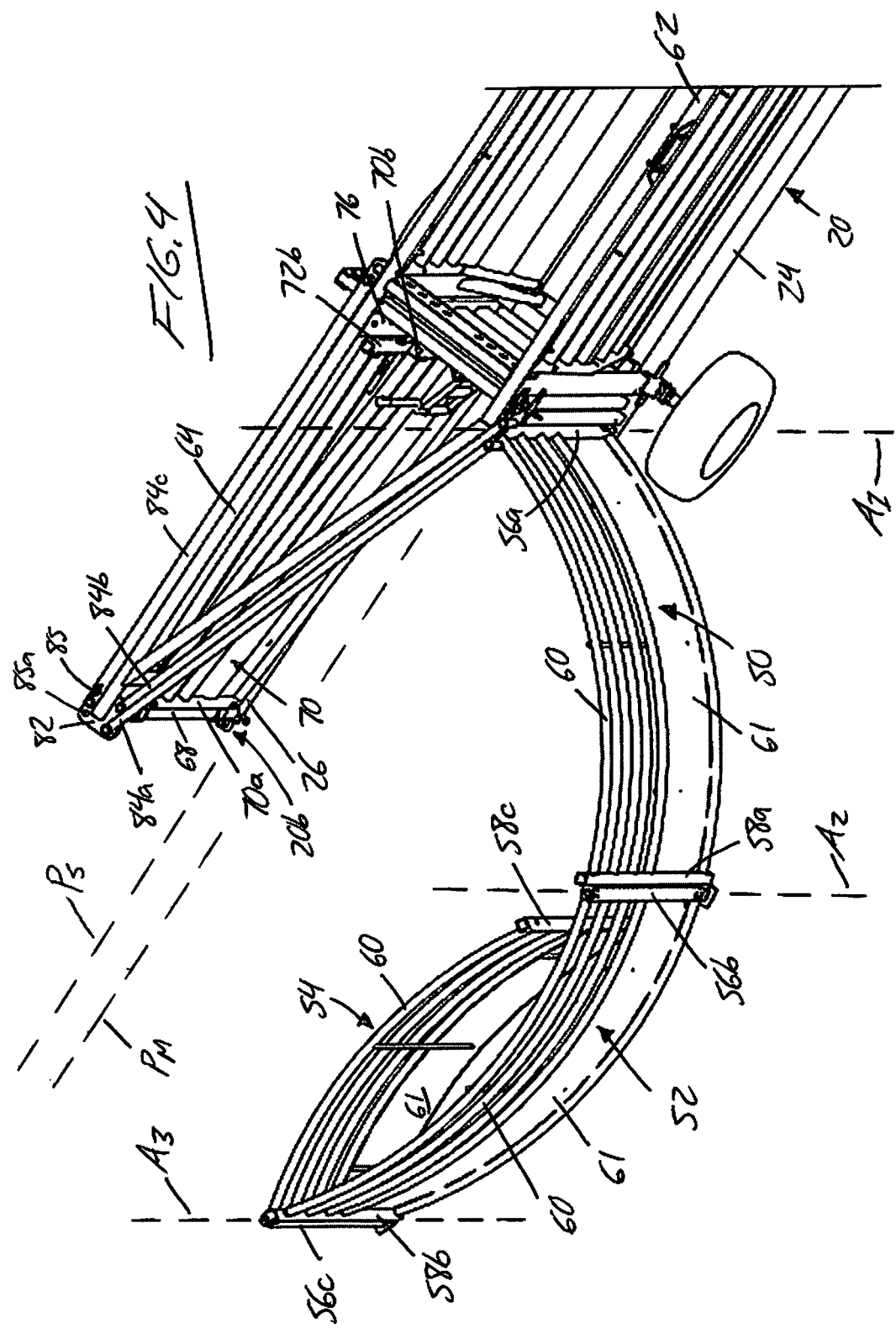
FIG. 4 is partial perspective view of the first embodiment apparatus at a second stage of said deployment.

As best shown in FIG. 4, the wall panels 50, 52, 54 of the tub feature three pivotal connections among them. At the first pivotal connection, the proximal end post 56a of the first wall panel 50 is pivotably mounted to the first side of the chassis at or adjacent the rear end of the first longitudinal chassis beam 24 for swinging movement of the first wall panel 50 relative to the chassis 20 about a first vertically upright pivot axis $A_1$ of fixed location at or adjacent the rear end of the first longitudinal chassis beam 24. At the second pivotal connection, the proximal end post 56b of the second wall panel 52 is pivotably coupled to the distal end post 58a of the first wall panel 50 for swinging movement of the second wall panel 52 relative to the first wall panel 50 about a second vertically upright pivot axis $A_2$, whose variable position is dictated by the position occupied by the first wall panel 50 at any given time. At the third pivotal connection, the proximal end post 56c of the third wall panel 54 is pivotably coupled to the distal end post 58b of the second wall panel 52 for swinging movement of the third wall panel 54 relative to the second wall panel 52 about a third vertically upright pivot axis $A_3$, whose variable position is dictated by the position occupied by the second wall panel 52 at any given time FIGS. 1 and 2 show the foldable force tub in its fully folded, compact state placing the apparatus in its minimal-width road transport mode. Here, each wall panel 50, 52, 54 occupies a respective stowed position. The first wall panel 50 occupies a first stowed position spanning obliquely rearward from its pivotal mounting at the rear end of the first longitudinal chassis beam 24 in underlying relation to the bracing header beam 66 at a generally matching angle thereto. This places the distal end post 58a of the first wall panel 50 in close adjacency to the center post 68 of the force tub at the rear end 20b of the chassis 20.

The second wall panel 52 occupies a second stowed position folded up alongside the first wall panel 50 at the concave side thereof, such that the concave sides of the first and second wall panels 50, 52 face toward one another and the second wall panel 52 spans from its pivotal connection to the distal end post 58a of the first wall panel 50 back toward the proximal end post 56a of the first wall panel 50.

The first and second wall panels 50, 52 are of generally equal or similar length, whereby this places the distal end post 58b of the second wall panel 52 in close adjacency to the proximal end post 56a of the first wall panel 50.

The third wall panel 54 occupies a third stowed position folded up alongside the second wall panel 52 at the concave side thereof such that the concave sides of the second and third panels 52, 54 face toward one another, and the third wall panel 52 spans from its pivotal connection to the distal end post 58b of the second wall panel 50 back toward the proximal end post 56b of the second wall panel 52. This third stowed position occupied by the shorter third wall 54 panel resides in the space between the facing-together concave sides of the stowed first and second wall panels 50, 52, whose longer lengths make this space large enough to accommodate such nested stowage of the third wall panel between them. The convex side of the third wall 54 panel thus faces the concave side of the first wall panel 50, and spans therealong in generally conforming fashion thereto due to the matching radius of curvature shared thereby.

Accordingly, with reference to FIGS. 1 and 2, when all three wall panels are stowed, the first wall panel 50 faces laterally and rearwardly outward from the first side of the rearmost section 28 of the chassis 20 in opposing relation to the secured barrier and closure panels 70, 72 that are stowed at the second side of the rearmost chassis section 28. Meanwhile, the second wall panel 52 resides adjacent to the secured barrier and closure panels 70, 72, and the third wall panel 54 is stowed between the first and second wall panels 50, 52. A ratchet strap or other securing means can be wrapped around one or both of the hinged-together distal end post 58a of the stowed first wall panel 50 and proximal end post 56b of the stowed second wall panel 52, and optionally also around the nearby distal end post 58c of the stowed third wall panel 54, and around the nearby center post 68 at the rear end 20b of the chassis 20 to thereby secure all three wall panels in their folded-together stowed positions.

The process of unfolding the stowed wall panels 50, 52, 54 as part of the transition of the apparatus from road transport mode to field-use mode is now described. Using comparison of FIGS. 2 and 3 for reference, in a first step of the force tub's deployment, the first tub wall 50 is swung laterally outward from the first side of the chassis 20 about the first upright pivot axis $A_1$, during which the second and third wall panels 52, 54 are kept in their stowed relation to the first wall panel 50. The first wall panel 50 is swung out into a first deployed position spanning laterally outward from the first side of the chassis 20 and curving rearwardly from the front end of the rearmost section 28 thereof.

Figure 3:
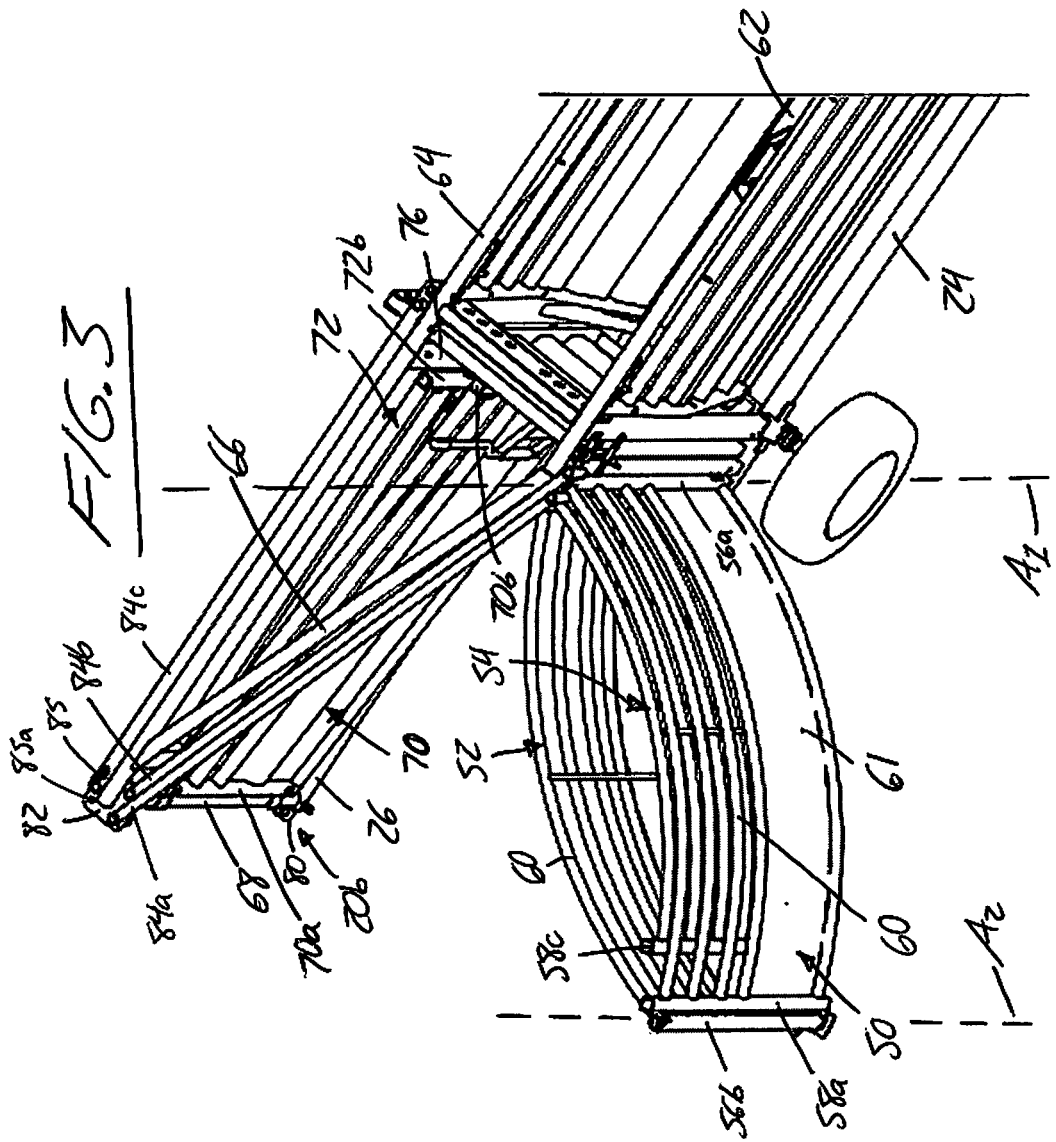
FIG. 3 is a partial perspective view of the first embodiment apparatus during deployment of a foldable force tub thereof, particularly illustrating a first stage of said deployment.

Using comparison of FIGS. 3 and 4 for reference, in a second step of the force tub's deployment, with the third wall panel 54 remaining in its stowed relation to the second wall panel 52, the second wall panel 52 is then swung away from the deployed first wall panel 50 about the second upright pivot axis $A_2$ into a second deployed position forming a continuous arcuate extension of the first wall panel's curvature. The deployed second wall panel 52 thus spans further rearwardly at the first side of the chassis to a point situated longitudinally past the rear end 20b thereof, and curves inwardly back toward a vertical midplane of the chassis 20 that lies centrally between and parallel to the longitudinal chassis beams 24, 26. The midplane $P_M$ is represented schematically in FIG. 4 by a broken line representing the intersection of this midplane with the ground.

Figure 5:
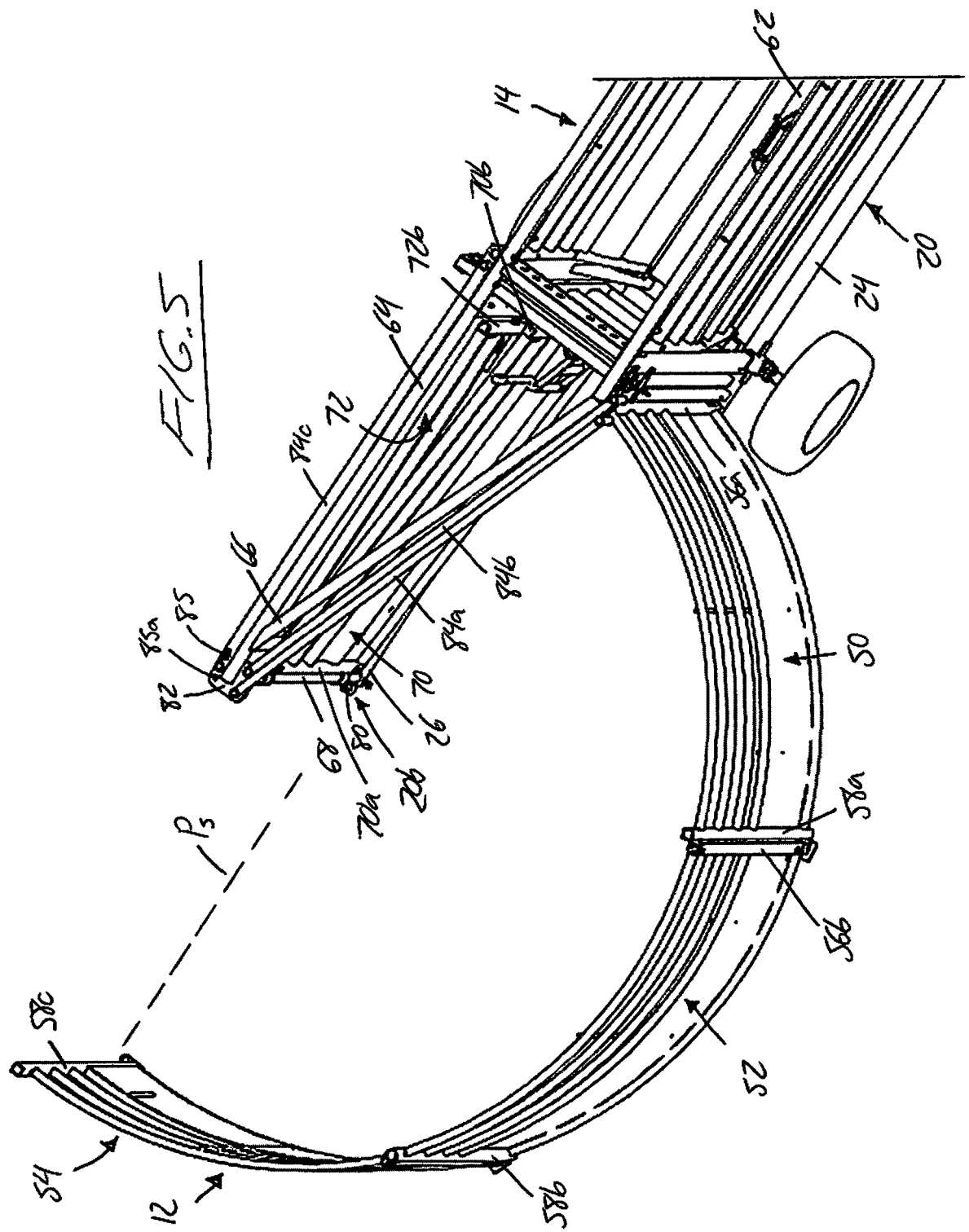
FIG. 5 is partial perspective view of the first embodiment apparatus at a third stage of said deployment.

Using comparison of FIGS. 4 and 5 for reference, in a third step of the force tub's deployment, the third wall panel 54 is then swung away from the deployed second wall panel 52 about the third upright pivot axis $A_3$ into a third deployed position forming a continuous arcuate extension of the second wall panel's curvature, thus spanning further rearwardly and further inwardly toward, and then through, the vertical midplane $P_M$ of the chassis. Reaching through the midplane $P_M$, this third deployed position places the distal end post 58c of the third wall panel 54 at a vertical side plane $P_S$ of the chassis occupied by the second longitudinal chassis and header beams 26, 64. This side plane $P_S$, like the midplane $P_M$ to which it is parallel, is represented schematically by a broken line denoting this plane's intersection with the ground. Accordingly, this third deployed position occupied by the third wall panel 54 aligns the distal end post 58c thereof with the rear end 20b of the chassis, as shown in FIG. 5. With all three arc-shaped wall panels 50, 52, 54 deployed, they thus cooperatively form an arcuately-shaped perimeter wall span of the force tub 12.

Figure 6:
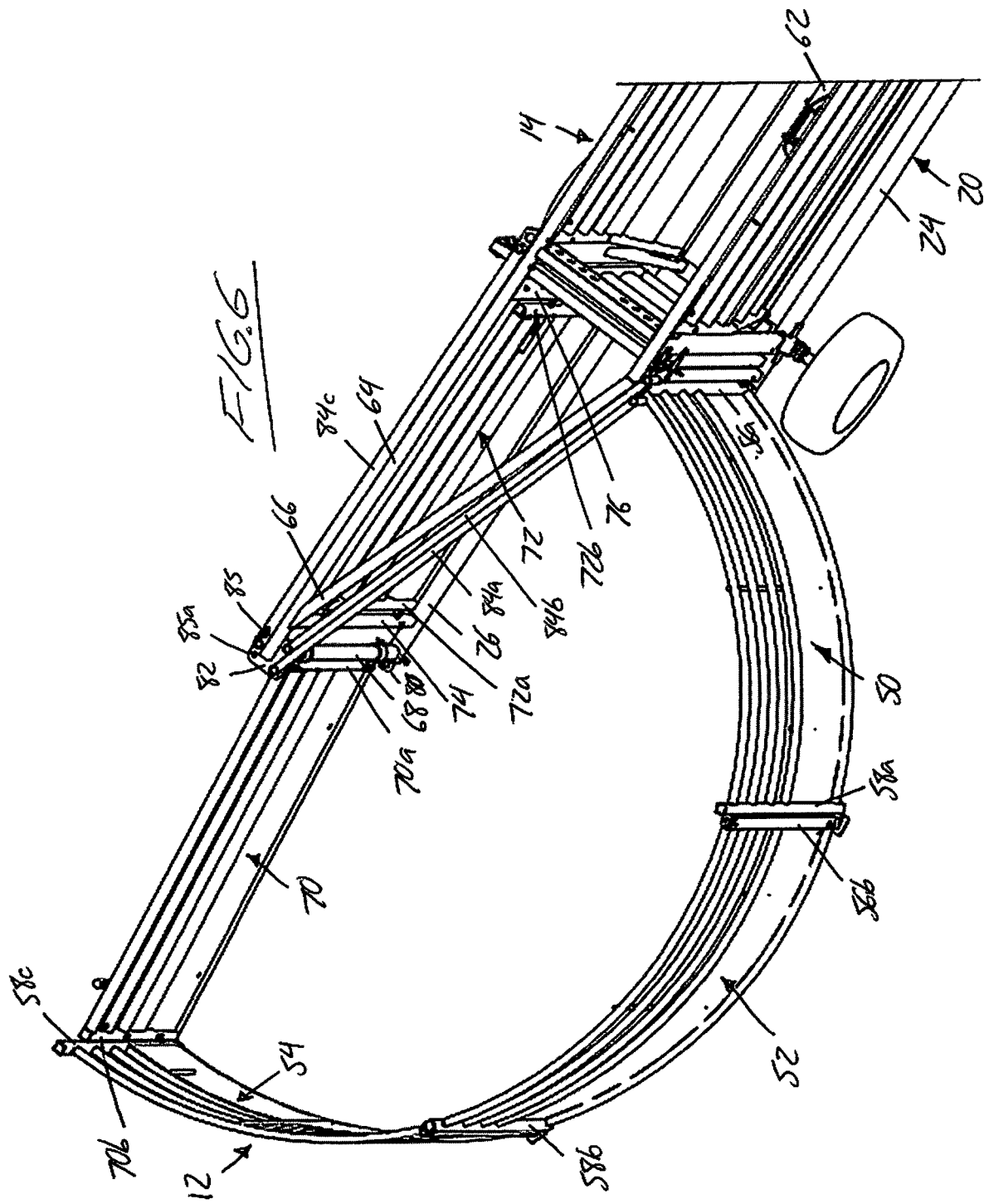
FIG. 6 is partial perspective view of the first embodiment apparatus at a fourth stage of said deployment.

With the arcuate wall span of the force tub now setup, the movable barrier panel 70 is released from its secured position stowed in the rearmost chassis section, for example as normally maintained in the road transport mode by a ratchet strap or securement means wrapped around a distal end post 70b of the barrier panel 70 and the securement post 76 adjacent which this distal end post 70b resides in the barrier panel's stowed position. Using comparison of FIGS. 5 and 6 for reference, in this fourth step of the force tub's deployment, the released movable barrier panel 70 is swung about its hinged connection to the center post 68 in a setup direction moving away from the secured closure panel 72, during which the distal end post 70b of the closure panel is swept along the concave inner side of the arcuate wall span of the tub in close adjacency thereto, until the distal end post 70b reaches the distal end post 58c of the third wall panel 54, as shown in FIG. 6. The movable barrier panel 70 is thus now in a ready-position spanning between center post 68 and a terminal end of the tub's arcuate wall span denoted by this distal end post 58c of the third wall panel. Once livestock are admitted to the force tub, subsequent movement of the barrier panel in a reverse working direction from this ready-position toward the tub-exit/alleyway entrance is operable to urge the admitted livestock to and through said tub-exit/alleyway entrance.

In the illustrated embodiment, admission of livestock may be performed in front-loading fashion using the movable closure 72 for front loading of the tub, or in rear-loading fashion by swinging of the movable barrier panel 70 past the ready position to open up a rear-entrance area between the center post 68 and the distal end post 58c of the third wall panel 54. However, before such admission, final steps of tub deployment are first performed to reinforce the deployed positions of the wall panels.

A hub 82 mounted atop the center post 68 features a set of three upper spokes 84a, 84b, 84c coupled thereto, of which first and second spokes 84a, 84b are coupled to the hub on an inner side thereof nearest the first side of the chassis from which the wall panels are deployed, while the third spoke 84c is coupled to the hub on an opposing outer side thereof. In the road transport mode of the apparatus, the first and second spokes 84a, 84b are secured in stowed positions spanning forwardly along the bracing head beam 66 from their coupled connection to the hub 82 toward the rear end of the first longitudinal header beam 62 at the shorter first side of the chassis, which may be equipped with a shared holding bracket 86, or pair of discrete holding brackets, for receiving and securing the distal ends of these stowed first and second spokes 84a, 84b. Using comparison of FIGS. 6 and 7 for reference, at this fifth stage of deployment, the first spoke 84a coupled to the hub 82 at a point further rearward thereon that that at which the second spoke 84b is coupled is removed from its stowed position reaching longitudinally forward from the hub, or pivoted therefrom, and reoriented from its designated connection point on the hub to instead reach laterally outward past the first side of the chassis in a working position extending to a pre-designated coupling point on one of the wall panels. In the illustrated embodiment, this coupling point is defined by a female opening at the top end of the distal end post 58b of the second wall panel 52, which receives a mating male feature, e.g. short stub shaft, hanging downwardly from the distal end of the spoke 84a.

Figure 7:
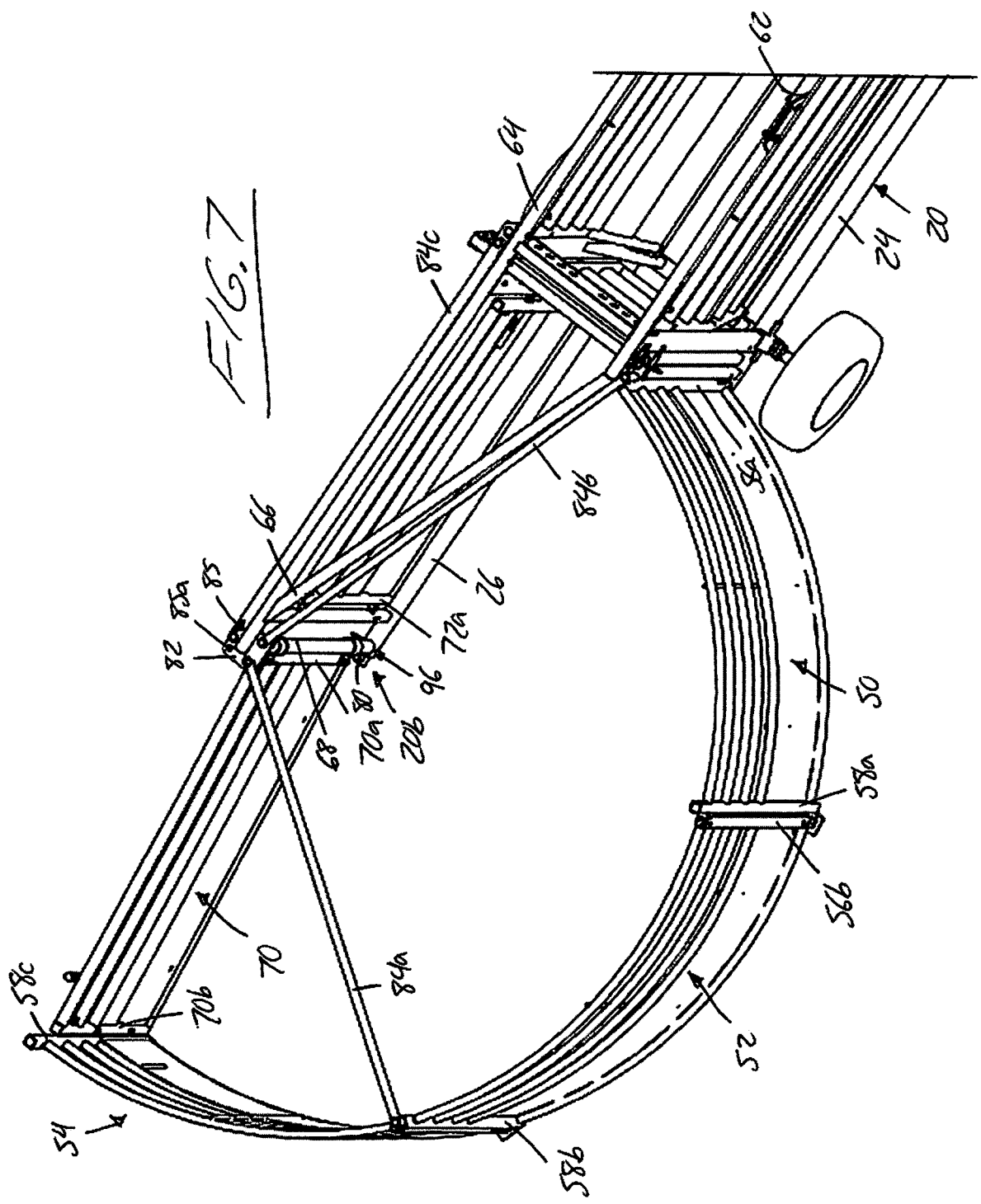
FIG. 7 is partial perspective view of the first embodiment apparatus at a fifth stage of said deployment.

Using comparison of FIGS. 7 and 8 for reference, the second spoke 84b coupled to the hub 82 at more forwardly point thereon is then likewise removed from, or pivoted about, its connection to the hub, and is reoriented relative thereto from its longitudinally forward-reaching stowed position to a laterally outward reaching working position mated with another pre-designated coupling point situated more forwardly along the deployed wall panels than the pre-designated coupling point of the first spoke 84a. In the illustrated instance, this predetermined coupling point of the second spoke 84b is likewise defined by a female opening at the top end of the distal end post 58a of the first wall panel 50. Instead of mating with female openings in the tops of the distal end posts 58a, 58b of the first and second wall panels 50, 52 as illustrated, the male features of the spokes may be mated with female openings in the tops of the proximal end posts 56b, 56c of the second and third wall panels 52, 54.

Telescopically received inside the longer second chassis beam 26 is a chassis extension beam 80 that is slidably movable in the longitudinal direction between a retracted storage position contained entirely, or nearly entirely, within the second chassis beam 26, and an extended working position. FIGS. 1 through 7 show the extension 80 in the retracted storage position so as to have minimal rearward protrusion beyond the rear end 20b of the chassis in the transport mode of the apparatus. By comparison, FIG. 8 shows the extension beam 80 in the extended working position reaching further rearward from the rear end 20b of the chassis to connect to the deployed third wall panel 54 at the distal end post 58c thereof that aligns with the rear end 20b of the chassis at the vertical side plane of the second side of the apparatus. This detachable coupling of the selectively deployable chassis extension to the distal end post 58c of the third wall panel 54 is thus operable to hold the third wall panel 54 in its deployed position, preventing folding thereof toward the second wall panel 52.

FIG. 10 shows a partial closeup of the chassis extension beam 80 at a rear end 80a thereof at which the beam is configured for detachable coupling to the third wall panel 54 at the distal end post 58c thereof. In the illustrated embodiment, a male protrusion, for example in the form of a small stub shaft 88, stands upright from a topside of the extension beam 80 adjacent the rear end 80a thereof, and has a sufficiently small diameter to fit within a female opening at the bottom end of the distal end post 58c of the third wall panel 54. As with the female openings that receive the downwardly hanging male features of the upper spokes 84a, 84b, 84c at the top ends of the distal end posts 58a, 58b, 58c of the wall panels 50, 52, 54, this female opening at the bottom of third wall panel's distal end post 58c may be an integral feature of a length of hollow metal tubing of which the distal end post 58c is entirely or substantially comprised.

Accordingly, the extension beam 80 is extended out from the second longitudinal chassis beam 26, and the distal end of the third wall panel 54 is lifted slightly from the ground to elevate the bottom end of the distal end post 58c up over the top end of the male stub shaft 88 on the extension beam 80, and then the distal end of the third wall panel 54 is lowered back down in order to slide the female opening of the distal end post 58c over the stub shaft 88. As shown in FIG. 10, the stub shaft 88 may feature a horizontal cross-bore 90 therein that is oriented in the longitudinal direction of the extension beam 80 and positioned at suitable elevation to align with a corresponding horizontal cross-bore in the distal end post 58c of the third wall panel 54 when mated therewith to enable insertion of a suitable lock pin 92 to lock the extension beam 80 and the third wall panel 54 together. Likewise, another horizontal cross-bore 94 may penetrate laterally through the extension beam 80 itself at a location slightly forward of the stub shaft 88. In the retracted storage position of the extension beam 80, this lateral cross-bore 94 aligns with a corresponding lateral cross-bore in the second longitudinal chassis beam 26 for selective locking thereof in said retracted storage position by another lock pin 96.

It will be appreciated that these detailed coupling and locking options are presented in a non-limiting context, and that other means of detachable coupling between the chassis extension and third wall panel may alternatively be employed. In the illustrated embodiment, where the male upright coupling feature (stub shaft 88) on the extension beam prevents full retraction of the extension beam's entirely into the second longitudinal chassis beam 26, the rear end 80a of the extension beam 80 resides sticks out slightly past the rear end 20b of the chassis in the extension beam's retracted storage position. However, when other coupling means is employed between the extension beam and the third wall panel, the extension beam may retract fully into the second longitudinal chassis beam 26.

In road transport mode, the third spoke 84c is stowed in a position spanning longitudinally forward the from the hub 82 along the outside the second longitudinal header beam 64 to a point at or near the front end of the rearmost section 28 of the chassis, where this header beam 64 preferably features another bracket for holding the distal end of the third spoke 84c. Using comparison of FIGS. 8 and 9 for reference, the last step of deploying the force tub concerns deployment of this final spoke 84c. Like the first two spokes, the third spoke 84c is remove from, or pivoted about, its connection point to the hub 82, and reoriented into a rearwardly reaching position running generally parallel to the second longitudinal header beam 64 past the rear end thereof to connect to the distal end post 58c of the deployed third wall panel 54, for example once again via a female opening in the top end thereof that receives a compatible male feature, e.g. short stub shaft, depending downward from the distal end of the third spoke 84c. However, it will be appreciated that mating of hanging male features on the undersides of the spokes with female openings into the tops of the wall panel end posts is just one example of possible coupling configurations that may be used to establish connection of the spokes to the wall panels to lock the wall panels in place by preventing relative pivoting therebetween.

In the illustrated example, a locking pin 85 is provided for the third spoke 84c, and is engaged in a vertical through-bore thereof into a respective one of a pair of lock holes 85 provided in the outer side of the hub in front of and behind the third spokes coupling point to the hub. In its rearward-reaching working position connected to the distal end post of the third wall panel 54, the third spoke is thus rotationally locked to the hub by this lock pin to prevent pivoting of the spoke about its hub coupling point. Accordingly, the third spoke is set at a fixed orientation relative to the hub when pinned in its working position, whereby the fixed location of the third spoke's distal end can be used to fine tune the proper position of the third wall panels distal end in the deployed position of the third wall panel.

As shown by the fully setup force tub of FIG. 8, the interior space of the tub delimited between the concave interior sides of the deployed wall panels 50, 52, 54 and the ready-position and secured position of the barrier panel 70 and closure panel 72, respectively, is entirely free of any chassis beams or other ground-level components. In the illustrated embodiment, this is accomplished by the shortened chassis beam 24 on the first side of the apparatus that stops short of the force-tub's interior space, and use of only upper radial support spokes 84a, 84b, 84c without any lower spokes radiating outward from the center of the force tub at ground level. The number of trip hazards over which the livestock must pass during use of the handling apparatus is thus minimized, presenting a notable benefit over the prior art.

Meanwhile, the use of a selectively extendable/retractable chassis extension 80, whether telescopically received in the longer chassis beam 26 or slidably mounted alongside same in an external fashion, enables longitudinal reduction of the chassis in road-transport mode to cooperate with the unique width-minimizing folding configuration of the arc-shaped wall panels to minimize the overall apparatus dimensions in transport mode. On the other hand, it will be appreciated that the particularly novelty of the shortened one side of the chassis and use of only upper support spokes to minimize tripping hazards may be enjoyed regardless of whether the rearmost chassis extension on the second size of the chassis is a permanently fixed component, or selectively retractable or removable component.

Transition of the apparatus from field-use mode back to road-transport mode is simply the reversal of the procedure described above and illustrated in FIGS. 3 to 8, for example starting with removal or pivoting of the upper spokes 84a, 84b, 84c from their working positions and reorientation thereof into their forwardly spanning stowed positions, and before or after such stowage of the upper spokes, decoupling of the chassis extension beam 80 from the third wall panel 54 and forward sliding of the chassis extension beam 80 back it to its retracted position. Such decoupling and stowage of the wall-holding spokes and chassis extension is followed by swinging movement and securement the movable barrier panel 70 into its stowed position, along with the closure panel if configured as a movable gate panel for front-loading of the tub. Then, the wall panels 50, 52, 54 are sequentially folded in their stowed positions, by folding the third wall panel 54 into stowed relation to the second wall panel 52, folding the second wall panel 52 into stowed relation to the first wall panel 50, and then folding the first wall panel into stowed relation to the chassis.

It will be appreciated that during both the deployment and stowage processes, the particular order in which deployment/stowage of the spokes and chassis extension is performed relative to deployment/stowage of the barrier panel (and closure panel, if of the movable type for front-loading capability) may be reversed from those described and illustrated, so long as during deployment the arc-shaped wall panels are deployed before the barrier panel 70 is swung to the ready position, and during stowage, the barrier panel 70 is stowed before the arc-shaped wall panels are folded and stowed.

The chassis extension and use thereof to help support the unfolded force tub wall enables construction of other embodiments in which the alleyway is of greater than conventional length, yet with zero or minimal increase in road transport length compared to conventional designs where the chassis is of a fixed length spanning the full diameter of the deployed force tub. So in one three-station embodiment having a squeeze chute, a foldable force tub and an elongated alleyway therebetween, the alleyway may have a longitudinal length exceeding that of the squeeze chute, for example equaling or exceeding 1.25 times, 1.5 times or even 1.75 times the longitudinal length of the squeeze chute in some non-limiting examples.

It will be appreciated that while embodiment illustrated in FIGS. 1 through 9 features three arc-shaped wall panels to form a generally semi-circular tub whose collective arcuate wall span and exit opening cooperatively span 180-degrees around the center post, the particular angular span of the tub and the number of pivotally coupled arc-shaped wall panels may vary.

In one alternative embodiment, shown schematically in FIGS. 11A and 11B, a force tub of greater than semi-circular span features four pivotally coupled arc-shaped wall panels, instead of the three wall panels of the earlier embodiment. The added fourth wall panel 55 has a proximal end post 56d thereof pivotally coupled to the distal end post 58c of the third wall panel 54 for swinging movement thereof between stowed and deployed positions. The fourth wall panel's stowed position, shown in FIG. 11B, resides in adjacent relation alongside the third wall panel 52, such that the concave sides of these third and fourth wall panels 54, 55 face toward one another and the fourth wall panel 55 spans from its pivotal connection at the distal end post 58c of the third wall panel 54 back toward the proximal end post 56c of the third wall panel 54. The fourth wall panel 55 is of slightly lesser length than the third wall panel 54 so that it can be accommodated in the space between the facing-together concave sides of the second and third wall panels 52, 54 when stowed. Accordingly, when the panels are all stowed, the convex side of the fourth wall panel 55 faces the concave side of the second wall panel 52, and spans therealong in generally conforming fashion thereto due to the matching radius of curvature shared by all four wall panels.

When the force tub is fully deployed, as shown in FIG. 11A, the fourth wall panel 55 forms a continuous arcuate extension of the third wall panel's arcuate curvature from the distal end thereof, thus cooperating with the other three wall panels to form the collective arcuate wall span of the force tub, which in this example therefore reaches through the vertical side plane $P_S$ and past the extended chassis extension beam 80 residing therein. The angular span of the deployed arc-shaped wall panels and tub-exit therefore exceeds 180-degrees, but stops short of 270-degrees, in this alternative embodiment. As shown in FIG. 11A, the ready position of the movable barrier panel 70 in this embodiment thus extends toward the distal end post 58d of the added fourth arc-shaped wall panel 55, rather than toward the distal end post 58c of the third wall panel 54.

In addition, the FIG. 11 embodiment features a supplemental wall section 100 having a proximal side 100a pivotally supported on the chassis for hinged swinging movement about another vertically upright pivot axis at or adjacent an upright frame member of the tub-exit/alleyway-entrance at the side thereof opposite that at which the first arc-shaped wall panel 50 is likewise pivotally mounted to the chassis for swinging movement relative thereto. The supplemental wall section 100 is thus pivotable between a deployed position spanning laterally out from the tub-exit/alleyway-entrance at the second side of the chassis, as shown in FIG. 11A, and a stowed position folded up generally parallel to the second side of the chassis to reside alongside the similarly stowed and secured position of the movable closure panel 72, as shown in FIG. 11B.

In deployment of the force tub, the supplemental wall section 100 is swung out to its deployed position. Rather than a front-loading entrance opening delimited in the longitudinally oriented vertical side plane $P_S$ between the longitudinal header and chassis beams 26, 64 at the second side of the chassis, a front-loading entrance area of the tub in this embodiment instead resides in an obliquely angled vertical plane $P_A$, and is defined between the support post 74 of the movable closure panel 72 and a distal side 100b of the supplemental wall section 100 that is situated opposite the hinged proximal side 100a thereof. To open the front-loading entrance area, the movable closure panel is swung outwardly away from the chassis past this front-loading entrance area to enable admission of the livestock into the tub through this opened front-loading entrance area. After admission of the livestock, the movable closure panel swung into a closed position occupying and obstructing this entrance area, as shown in FIG. 11A, and is secured in this position by latching of the closure panel's end post 72b to the distal side 100b of the supplemental wall section 100. The movable barrier panel 70 is then swung from its ready position, shown in FIG. 11A, toward the tub-exit/alleyway-entrance in order to encourage the admitted cattle or other livestock therethrough.

In the interest of illustrative simplicity, the schematic illustrations of the alternative embodiment omit the set of upper spokes that are preferably included to lend stability to the deployed wall panels. In this embodiment, the upper spokes may include a fourth such upper spoke, for example normally stowed in longitudinal relation on or alongside the second longitudinal header beam 64 like the third spoke 84c of the earlier embodiment, and movable into a working position spanning from the hub 82, or a point on the framework header near thereto, to the distal end post 58d of the fourth wall panel 55 for coupled connection thereto, for example using the same male/female coupled connection described in the earlier embodiment for the other spokes.

The supplemental wall section 100 preferably has an at least partially uncladded skeletal structure so as to enable admission of ambient light into the tub therethrough, and thereby also providing the livestock with visible sightlines to the surrounding environment. The supplemental wall section 100 enlarges the effective interior size of the tub by adding an extra sector-shaped auxiliary space S that spans beyond the tub exit from the second side of the chassis to the entrance area defined at the distal side 100b of the supplemental wall section 100 in the obliquely angled plane $P_A$ lying generally radially of the tub. Optionally, the supplemental wall section may be a flat planar panel 100, as illustrated, rather than a curved panel like the other wall panels 50, 52, 54, since curvature of the outer wall of the tub is not necessary at this supplemental section of the tub's outer perimeter, unlike at the curved wall panels along which the movable barrier is swung to encourage livestock toward the tub-exit during use of the apparatus.

The light admission and visibility through the supplemental wall section 100 helps encourage the livestock to navigate forwardly toward the tub-exit once having turned around from an initial rearward loading direction in which they entered the tub through the front-loading entrance area. Further details on the use and benefit of such a tub design is found in Applicant's prior PCT Application No. PCT/CA2018/050961, filed Aug. 7, 2018, the entirety of which is incorporated herein by reference.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A livestock handling apparatus comprising:
    a chassis having a front end and opposing rear end spaced apart in a longitudinal direction;
    a collapsible force tub carried on said chassis at a rearmost section thereof nearest the rear end of said chassis, said collapsible force tube comprising a plurality of arc-shaped wall panels selectively placeable in cooperatively deployed positions to form a collective arcuate wall span along which livestock can be encouraged; and
    a chassis extension movably mounted to the chassis in a manner selectively slidable longitudinally rearward from a retracted storage position into an extended working position in which said chassis extension spans rearwardly from the rear end of the chassis and connects to said collective arcuate wall span at a spaced distance from said rear end of the chassis.

2. The apparatus of claim 1 wherein the rearmost section of the chassis has a first shorter side and a second longer side, of which said second longer side defines said rear end of the chassis, and the chassis extension, in the extended working position thereof, spans rearwardly from the longer second side of the rearmost section of the chassis.

3. The apparatus of claim 2 wherein, other than the chassis extension and said longer second side of the rearmost section of the chassis, the apparatus is free of any other ground-level connections between the chassis and the arc-shaped wall panels when deployed, thereby minimizing tripping hazards in force tub.

4. The apparatus of claim 1 wherein said chassis extension is a single-beam extension, and is a sole rearward extension of said chassis.

5. The apparatus of claim 1 wherein said chassis extension is slidable along a longitudinal beam at the rearmost section of the chassis for selective extension therefrom into the extended working position.

6. The apparatus of claim 5 wherein said chassis extension is telescopically received in a hollow interior of said longitudinal beam.

7. The apparatus of 5 wherein said longitudinal beam is an only beam of the chassis that spans at least a longitudinal majority of the rearmost section of the chassis.

8. The apparatus of claim 5 wherein said longitudinal beam is situated at one side of the rearmost section of the chassis, and said rearmost section lacks a matching longitudinal beam at an opposing side thereof.

9. The apparatus of claim 1 wherein an interior space of the force tub, when deployed, is entirely free of any ground level components, thereby avoiding potential tripping hazards.

10. A livestock handling apparatus comprising:
    a chassis having a front end and opposing rear end spaced apart in a longitudinal direction;
    a collapsible force tub carried on said chassis at a rearmost section thereof nearest the rear end of said chassis, said collapsible force tube comprising a plurality of arc-shaped wall panels selectively placeable in cooperatively deployed positions to form a collective arcuate wall span along which livestock can be encouraged; and a plurality of spokes movable between stowed positions carried on the chassis in positions reaching forwardly along the chassis toward the front end thereof, and working positions radiating outwardly from a hub on the rearmost section of the chassis and connecting up with the collective arcuate wall span cooperatively formed by the arc-shaped wall panels;

wherein said plurality of spokes include:
at least a first spoke whose stowed position is located on a first side of the chassis; and
at least one additional spoke whose stowed position is located on an opposing second side of the chassis.

11. The apparatus of claim 10 wherein the plurality of spokes further comprises a second spoke whose stowed position is also located on the first side of the chassis.

12. The apparatus of claim 11 wherein both the first and second spokes are pivotally coupled to the hub for pivotal movement on the first side of the chassis out of their stowed positions toward their working positions.

13. The apparatus of claim 10 wherein the first spoke is pivotally coupled to the hub for pivotal movement on the first side of the chassis out of its stowed position toward its working position.

14. The apparatus of claim 10 wherein the stowed position of said additional spoke is more parallel to the longitudinal direction of the chassis than the stowed position of the first spoke.

15. A livestock handling apparatus comprising:
a framework comprising a chassis having a front end and opposing rear end spaced apart in a longitudinal direction; and
a collapsible force tub carried on said chassis at a rearmost section thereof nearest the rear end of said chassis, said collapsible force tube comprising a plurality of arc-shaped wall panels selectively placeable in cooperatively deployed positions to form a collective arcuate wall span along which livestock can be encouraged;
wherein the rearmost section of the chassis has a first shorter side and a second longer side, and the plurality of arc-shaped wall panels are configured for selective stowage thereof at a location beside the longer side of the rearmost section of the chassis and behind the shorter side of the rearmost section of the chassis.

16. The apparatus of claim 15 wherein said rearmost section of the chassis lacks an angled brace between said first shorter side and said second longer side.

17. The apparatus of claim 15 wherein said framework further comprises:
a header that resides in overhead relation to the chassis and likewise has a first shorter first side and a second longer side, which respectively overlie the first shorter side and second longer side of the chassis; and
an angled brace that, at a location of overhead relation to the rearmost section of the chassis, spans obliquely between the shorter and longer sides of the header in overlying relation to at least one of the arc-shaped panels when stowed.

18. The apparatus of claim 17 wherein the rearmost section of the chassis lacks an angled brace spanning between its first shorter side and second longer side.

19. The apparatus of claim 15 wherein the arc-shaped wall panels include:
a first arc-shaped wall panel movable between a first deployed position spanning laterally outward from the chassis and a first stowed position of lesser lateral extent from said chassis; and
a second arc-shaped wall panel movable between a second deployed position forming an arcuate extension of the first arc-shaped wall panel when in the first deployed position, and a second stowed position in which concave sides of the first and second arc-shaped walls face toward one another, with a convex side of the second arc-shaped wall facing the longer side of the rearmost section of the chassis when said first and second arc-shaped panels are stowed at said location beside the longer side of the rearmost section of the chassis and behind the shorter side of the rearmost section of the chassis.

20. The apparatus of claim 19 wherein the arc-shaped wall panels also include a third arc-shaped wall panel movable between a third deployed position forming an arcuate extension of the second arc-shaped wall when in the second deployed position, and a third stowed position residing between the first and second arc-shaped wall panels at said location beside the longer side of the rearmost section of the chassis and behind the shorter side of the rearmost section of the chassis.

* * * * *